United States Patent
Yanagi et al.

(10) Patent No.: US 9,814,087 B2
(45) Date of Patent: Nov. 7, 2017

(54) COMMUNICATION SYSTEM AND COMMUNICATION APPARATUS

(71) Applicant: FUJITSU COMPONENT LIMITED, Tokyo (JP)

(72) Inventors: Masahiro Yanagi, Tokyo (JP); Kimihiro Maruyama, Tokyo (JP); Tatsuya Kakehashi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 82 days.

(21) Appl. No.: 14/986,814

(22) Filed: Jan. 4, 2016

(65) Prior Publication Data
US 2016/0212787 A1 Jul. 21, 2016

(30) Foreign Application Priority Data
Jan. 19, 2015 (JP) .................................. 2015-008116

(51) Int. Cl.
*H04W 76/02* (2009.01)
*H04W 40/14* (2009.01)
(Continued)

(52) U.S. Cl.
CPC ......... *H04W 76/025* (2013.01); *H04L 45/122* (2013.01); *H04L 45/124* (2013.01);
(Continued)

(58) Field of Classification Search
CPC ... H04W 40/08; H04W 40/22; H04W 76/025; H04W 16/32; H04W 28/0236;
(Continued)

(56) References Cited

U.S. PATENT DOCUMENTS

| 2010/0261425 A1* | 10/2010 | Almgren ............ H04B 7/15535 455/7 |
| 2011/0051699 A1 | 3/2011 | Raman |
| 2013/0279409 A1 | 10/2013 | Dublin, III et al. |

FOREIGN PATENT DOCUMENTS

JP  2001-237764  8/2001

OTHER PUBLICATIONS

Deering S et al.: "ICMP Router Discovery Messages; rfc1256.txt", 5. JCT-VC Meeting; 96. MPEG Meeting; Mar. 16, 2011-Mar. 23, 2011; Geneva; (Joint Collaborative Team on Video Coding of ISO/IEC JTC1/SC29/WG11 and ITU-T SG.16); URL: http://wftp3.itu.int/av-arch/jctvc-site/, Internet Engineering Task Force, IETF, Ch, Sep. 1, 1991 (Sep. 1, 1991), XP015007044, ISSN: 0000-0003.

\* cited by examiner

*Primary Examiner* — Gbemileke J Onamuti
(74) *Attorney, Agent, or Firm* — IPUSA, PLLC

(57) ABSTRACT

A communication system in which a communication apparatus includes a calculation unit configured to calculate, upon receiving a search signal from a new communication apparatus, a first time length by multiplying a first weighting time length by a relay count in a communication route to a destination, a second time length by multiplying a second weighting time length shorter than the first weighting time length by the signal strength of each communication link in the communication route, and a third time length by adding the first and second time lengths, and a transmission unit configured to transmit a response signal upon passage of the third time length from the receipt of the search signal, wherein upon receiving the response signal from one of the communication apparatuses ahead of any other response signals, the new communication apparatus sets the one of the communication apparatuses as the most adjacent relay point.

7 Claims, 6 Drawing Sheets

|                    | D1  | D2  | D3 | D4  | D5  | D6  | D7  | D8  | D9  |
|--------------------|-----|-----|----|-----|-----|-----|-----|-----|-----|
| RELAY COUNT        | 0   | 1   | -  | 0   | 1   | 0   | 3   | 2   | 1   |
| RSSI VALUE OF LINK 1 | -40 | -40 | -  | -90 | -70 | -70 | -30 | -50 | -80 |
| RSSI VALUE OF LINK 2 | NA  | -40 | -  | NA  | -70 | NA  | -50 | -80 | -70 |

(51) Int. Cl.
| | |
|---|---|
| *H04W 28/14* | (2009.01) |
| *H04W 16/32* | (2009.01) |
| *H04W 28/02* | (2009.01) |
| *H04W 40/08* | (2009.01) |
| *H04W 40/22* | (2009.01) |
| *H04L 12/733* | (2013.01) |
| *H04L 12/721* | (2013.01) |
| *H04W 74/08* | (2009.01) |

(52) U.S. Cl.
CPC ....... *H04W 16/32* (2013.01); *H04W 28/0236* (2013.01); *H04W 28/14* (2013.01); *H04W 40/08* (2013.01); *H04W 40/14* (2013.01); *H04W 40/22* (2013.01); *H04W 74/085* (2013.01)

(58) Field of Classification Search
CPC .... H04W 28/14; H04W 40/14; H04L 45/122; H04L 45/124
See application file for complete search history.

FIG.5

|  | D1 | D2 | D3 | D4 | D5 | D6 | D7 | D8 | D9 |
|---|---|---|---|---|---|---|---|---|---|
| RELAY COUNT | 0 | 1 | — | 0 | 1 | 0 | 3 | 2 | 1 |
| RSSI VALUE OF LINK 1 | −40 | −40 | — | −90 | −70 | −70 | −30 | −50 | −80 |
| RSSI VALUE OF LINK 2 | NA | −40 | — | NA | −70 | NA | −50 | −80 | −70 |

COMMUNICATION SYSTEM AND COMMUNICATION APPARATUS

BACKGROUND OF THE INVENTION

1. Field of the Invention

The disclosures herein generally relate to a communication system and a communication apparatus.

2. Description of the Related Art

In a multi-hop wireless network, each wireless station obtains information indicative of a hop count from the other wireless station that is connectable. When a wireless station can establish a direct connection with a base station, the base station is selected as a higher-hierarchical level wireless station. In the case of the base station is not directly connectable, the other wireless station that is connectable to the wireless station and that has the smallest hop count is selected as the higher-hierarchical level wireless station. The wireless station then transmits a transmission signal or signals received from children wireless station to the higher-hierarchical-level wireless station. In the case of a direct connection to the base station being established, such a signal or signals are transmitted to the base station (see Japanese Patent Application Publication No. 2001-237764, for example).

When an attempt is made to select a connectable wireless station having the smallest hop count, there may be a plurality of connectable wireless stations having the smallest hop count.

Further, signal strength may be relatively weak with respect to the communication with the selected connectable wireless station or with respect to the communication between the base station and the selected connectable wireless station. In that case, it might be difficult to secure sufficient communication quality, and the communication route being unstable.

Accordingly, it may be desirable to provide a communication system and a communication apparatus that enable the securement of a stable communication route.

SUMMARY OF THE INVENTION

It is an object of the present invention to provide a communication system that substantially obviates one or more problems caused by the limitations and disadvantages of the related art.

According to an embodiment, a communication system includes a parent apparatus and a plurality of child apparatuses to form a wireless communication network with the parent apparatus, wherein any given child apparatus among the plurality of child apparatuses includes a storage unit configured to store a relay count indicative of a number of other child apparatuses serving as relay points in a communication route from the given child apparatus to the parent apparatus, and to store data indicative of a signal strength in each communication link existing in the communication route, the communication link being defined between two child apparatuses or between a child apparatus and the parent apparatus, a time calculation unit configured to calculate, upon receiving a search signal from a child apparatus that is newly added to the communication system, a first time length by multiplying a first weighting time length by the relay count stored in the storage unit, a second time length by multiplying a second weighting time length by a numerical value indicative of the signal strength of each communication link, and a third time length by adding the first time length and the second time length, the first weighting time length being longer than the second weighting time length, and a transmission unit configured to transmit a response signal in response to the search signal upon passage of the third time length starting from a time of receipt of the search signal, wherein upon receiving the response signal from one of the child apparatuses ahead of response signals from any other ones of the child apparatuses, the newly added child apparatus selects and sets a communication route from the newly added child apparatus to the parent apparatus such that the selected communication route includes the one of the child apparatuses as a relay point most adjacent to the newly added child apparatus.

According to at least one embodiment, a communication system and a communication apparatus are provided that enable the securement of a stable communication route.

Other objects and further features of the present invention will be apparent from the following detailed description when read in conjunction with the accompanying drawings.

BRIEF DESCRIPTION OF THE DRAWINGS

FIG. 5 is a drawing illustrating parameter data of the communication apparatus;

DESCRIPTION OF EMBODIMENTS

In the following, embodiments to which a communication system and a communication apparatus of the present disclosure are applied will be described.

Embodiment

Figure 1:
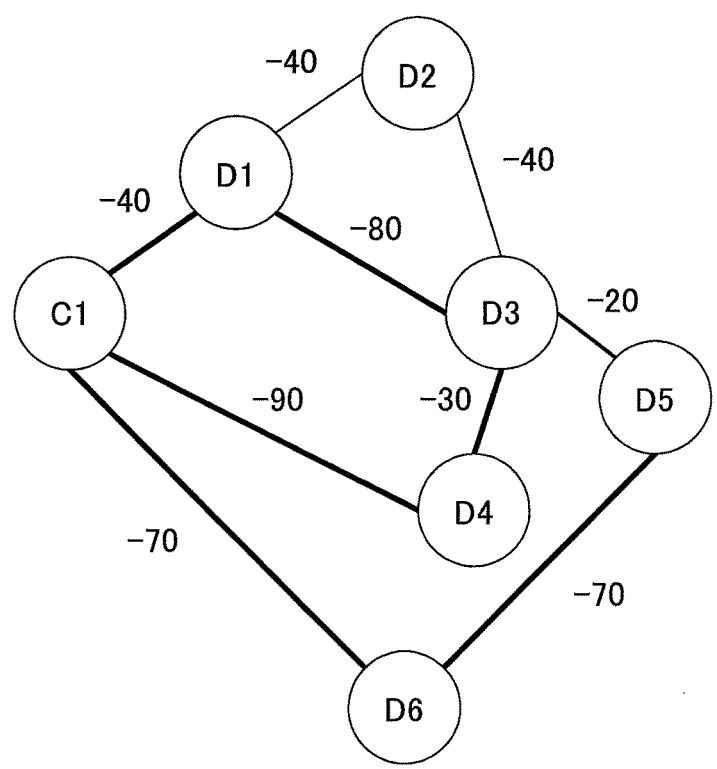
FIG. 1 is a drawing illustrating an arrangement of a communication system.

FIG. 1 is a drawing illustrating an example of the arrangement of a communication system. The communication system according to FIG. 1 includes a communication apparatus serves as a parent apparatus (or a base station), and a communication apparatus serves as a child apparatus (or a terminal).

The parent apparatus is a coordinator, and is represented by the alphabet "C". The child apparatuses are end devices, and are represented by the alphabet "D". In FIG. 1, one parent apparatus C1 and six child apparatuses D1 through D6 are illustrated.

In the following, a description will be given of how a communication route between the parent apparatus C1 and the child apparatus D3 is established when the child apparatus D3 is newly added to the communication system that originally includes the parent apparatus C1 and the child apparatuses D1, D2, D4, D5 and D6.

In the drawings, a communication link between a parent apparatus and a child apparatus or between two child apparatuses through which communication is enabled is illustrated by a solid line connecting two apparatuses. Further, a number affixed to the solid line expresses the value of the RSSI (received signal strength indicator) in decibels (dBm) with respect to the corresponding communication link. The RSSI represents the strength of a received signal. The strength of a given communication link is represented by the strength of the signal received at the receiving end of the given communication link.

The term "received signal" refers to a response signal received by a child apparatus that has transmitted a search signal from one or more other child apparatus in response to the search signal.

In FIG. 1, the signal strength of the communication link between the parent apparatus C1 and the child apparatus D1 is −40 dBm, and the signal strength of the communication link between the parent apparatus C1 and the child apparatus D4 is −90 dBm, with the signal strength of the communication link between the parent apparatus C1 and the child apparatus D6 being −70 dBm. Other than those, there are no communication links including the parent apparatus C1. This means that child apparatuses other than the child apparatuses D1, D4 and D6 do not have direct communication with the parent apparatus C1. The newly added child apparatus D3 does not have direct communication with the parent apparatus C1, either.

The signal strength of the communication link is −40 dBm between the child apparatuses D1 and D2, −80 dBm between the child apparatuses D1 and D3, −40 dBm between the child apparatuses D2 and D3, −30 dBm between the child apparatuses D3 and D4, −20 dBm between the child apparatuses D3 and D5 and −70 dBm between the child apparatuses D5 and D7. Other than those, there are no communication links between any two child apparatuses.

In such a state, possible communication routes for connecting the parent apparatus C1 and the newly added child apparatus D3 include the following four routes: (1) the route from the child apparatus D3 to the parent apparatus C1 through the child apparatus D1; (2) the route from the child apparatus D3 to the parent apparatus C1 through the child apparatuses D2 and D1; (3) the route from the child apparatus D3 to the parent apparatus C1 through the child apparatus D4; and (4) the route from the child apparatus D3 to the parent apparatus C1 through the child apparatuses D5 and D6.

Each of these four routes (1) through (4) has a different relay count that is the number of relaying child apparatuses in each route other than the child apparatus D3, and also has a different RSSI value. Among these, it is preferable to select the most stable route.

The route (1) extending from the child apparatus D3 to the parent apparatus C1 through the child apparatus D1 has a smallest relay count and a relatively high RSSI value. As the relay count of the route (1) is smaller than the relay counts of the other routes (2) and (4) and the RSSI values (−40 dBm and −80 dBm) of the route (1) have a better balance than the RSSI values (−30 dBm and −90 dBm) of the route (2), the route (1) may be selected. In other words, the route (1) including the communication link with an RSSI value of −80 dBm is capable of providing more stable communication than the route (2) including the communication link with an RSSI value of −90 dBm.

Selection of a communication route is not limited to the method described above. For example, the communication route having a largest square sum of RSSI values of each communication link constituting the communication route may be selected.

In the following, a different circumstance than the circumstance illustrated in FIG. 1 will be described with reference to FIG. 2.

Figure 2:
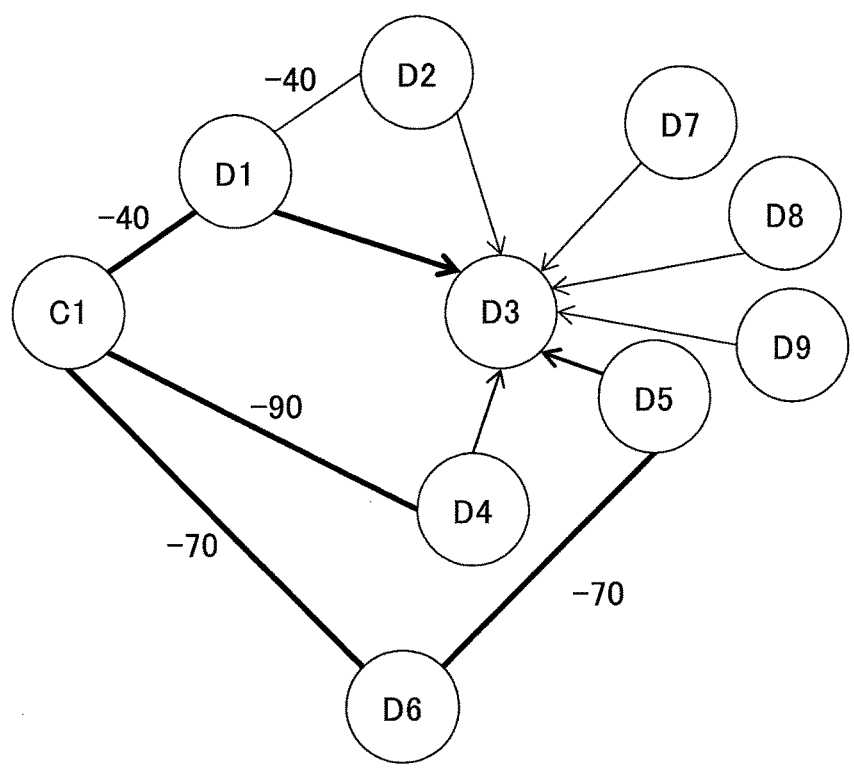
FIG. 2 is a drawing illustrating an arrangement of the communication system.

FIG. 2 is a drawing illustrating an example of the arrangement of a communication system.

In FIG. 2, one parent apparatus C1 and nine child apparatuses D1 through D9 are illustrated.

In the situation that is contemplated, the child apparatus D3 which is newly added to the communication system has transmitted a search signal, and, in response thereto, a response signal is about to be transmitted to the child apparatus D3 from the child apparatuses D1, D2, D4, D5, D7, D8 and D9 that are situated in the vicinity of the child apparatus D3.

The response signals from these child apparatuses are staggered by use of the carrier-sense method. Namely, any given child apparatus waits while another child apparatus transmits a response signal, and thereafter transmits a response signal in turn after the transmission of the response signal by such another child apparatus is completed. This is because overlapping of two or more response signals causes a failure of accurate data communication.

The carrier sensing functions properly when the child apparatuses D1, D2, D4, D5, D7, D8 and D9 can communicate with each other. If the child apparatuses D1 and D9 being unable to communicate with each other, for example, one of these child apparatus cannot gain information on the communication state of the other child apparatus, which may result in the child apparatuses D1 and D9 starting the transmission of response signals at the same time. Even if the simultaneous transmission by the child apparatuses D1 and D9 is avoided, the child apparatus D9 may transmit a response signal before the communication of a response signal by the child apparatus D1 is completed. In such a case, the two response signals partially overlap each other, resulting in a risk of failing to perform correct data communication.

In a nutshell, the presence of child apparatuses such as D1 and D9 that are unable to communicate with each other may cause transmission to overlap between the child apparatuses despite the use of the carrier-sense method, thereby creating a risk of failing to perform correct data communication.

Each child apparatus may have a defined response waiting period during which to receive a response signal from child apparatuses in the vicinity upon transmitting a search signal.

When the child apparatuses in the vicinity transmit response signals by use of the carrier-sense method, however, the order in which to transmit the response signals is determined on a first-come basis. In the case of a larger number of child apparatuses being present, some of the child apparatuses may not be able to transmit a response signal before the end of the response waiting period.

Such a child apparatus that has failed to transmit a response signal may possibly be included in the most favorable communication route from the child apparatus, which has transmitted a search signal, to the parent apparatus.

In this manner, the presence of a child apparatus that fails to transmit a response signal before the end of the response waiting period may result in a less-favorable communication route being selected. In this case, proper data communication may not be performed.

The present embodiment takes a measure that enables optimum data communication even under the above-noted circumstances.

In the following, a selection of a communication route from the child apparatus D3 to the parent apparatus C1 in the case in which the child apparatuses D1, D2, D4, D5, D7, D8 and D9 may start transmission substantially at the same time in response to a search signal transmitted by the child apparatus D3 will be described with reference to FIG. 2.

In this scenario, it is assumed that the most stable communication route for the child apparatus D3 to the parent apparatus C1 is the route through the child apparatus D1. Therefore, how the communication route from the child apparatus D3 to the parent apparatus C1 through the child apparatus D1 is selected will be described.

Figure 3A:
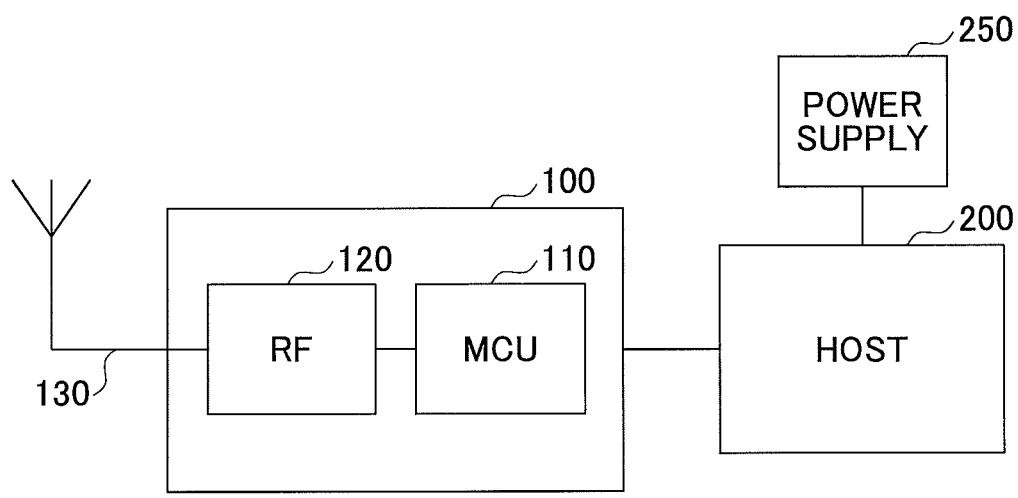
FIGS. 3A through 3C are drawings illustrating examples of a communication apparatus of the embodiment.
Figure 3B:
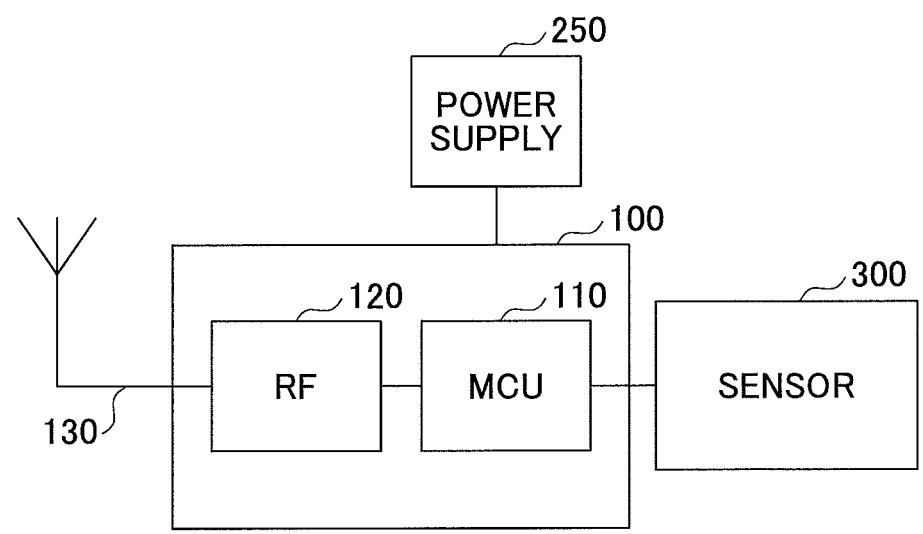
Figure 3C:
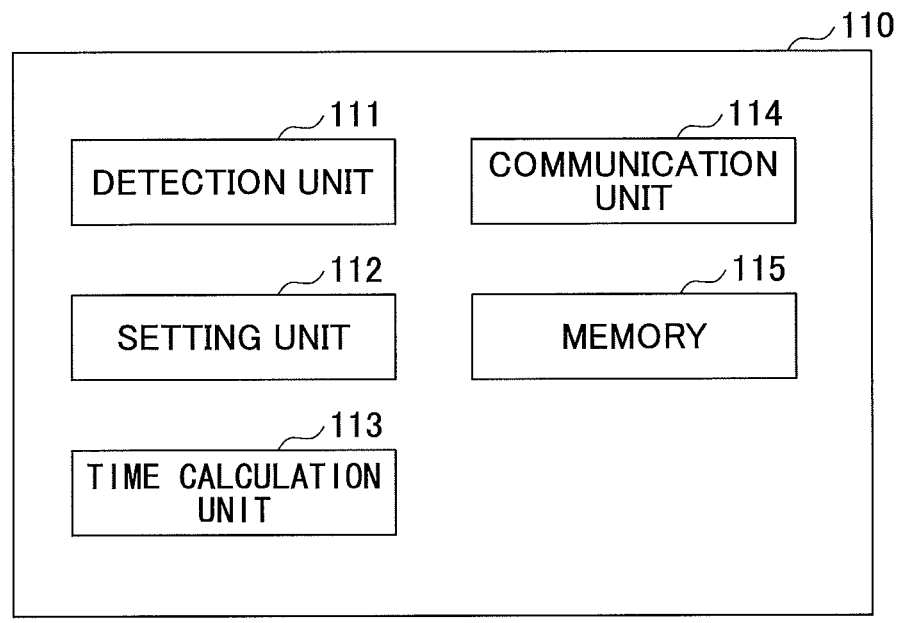

FIGS. 3A through 3C illustrate examples of a communication apparatus 100 included in the communication system of the present embodiment. The communication apparatus 100 as illustrated in FIG. 3A or FIG. 3B is used as a child apparatus. The communication apparatus 100 illustrated in FIG. 3A includes an MCU (microcomputer unit) 110, an RF (radio frequency) circuit 120, and an antenna 130. The MCU 110 performs a process of selecting and setting a communication route, and also performs processes for communicating with a parent apparatus after setting the communication route. The RF circuit 120 serves to perform conversion between data signals and high frequency signals between the MCU 110 and the antenna 130. The antenna 130 is not limited to a particular type of antenna, and may be a monopole antenna or dipole antenna, for example.

The communication apparatus 100 illustrated in FIG. 3A is coupled to a host computer (HOST) 200, which is coupled to a power supply 250. The host computer 200 performs transmission of commands and the like in connection with processes performed by the MCU 110.

The communication apparatus 100 illustrated in FIG. 3B includes the MCU 110, the RF circuit 120, and the antenna 130. The MCU 110 performs processes similar to the MCU 110 illustrated in FIG. 3A. The communication apparatus 100 illustrated in FIG. 3B is not coupled to the host computer, but is directly coupled to the power supply 250. In the communication apparatus 100 illustrated in FIG. 3B, the MCU 110 performs all processes on its own.

The communication apparatus 100 illustrated in FIG. 3B is coupled to a sensor 300. The sensor 300 may be a temperature sensor or the like. The communication apparatus 100 coupled to the sensor 300 may be used as the child apparatuses D1 through D6 illustrated in FIG. 1. Such an arrangement enables the measurement of temperatures at a plurality of points in the area in which the child apparatuses D1 through D6 are installed, and allows the parent apparatus C1 to collect data.

The MCU 110 illustrated in FIGS. 3A and 3B includes the functional blocks illustrated in FIG. 3C. The MCU 110 includes a detection unit 111, a setting unit 112, a time calculation unit 113, a communication unit 114 and a memory 115.

The detection unit 111 of the existing communication apparatus 100 detects a search signal that the communication unit 114 receives from another communication apparatus 100 which is newly installed in the communication system.

The detection unit 111 of the newly installed communication apparatus 100 detects a response signal form another communication apparatus 100 responding to the search signal that is transmitted from the communication unit 114. In this manner, the detection unit 111 detects other communication apparatuses 100 with which wireless communication is possible.

The setting unit 112 of the newly installed communication apparatus 100 selects and sets a communication route leading to a parent apparatus 400 through another communication apparatus 100 that is the first one to be detected by the detection unit 111.

Upon the detection unit 111 detecting a search signal received from another communication apparatus 100, the time calculation unit 113 obtains a first time length by multiplying a first unit time length by a relay count specified in data stored in the memory 115, and also obtains one or more second time lengths by multiplying a second unit time length by the RSSI value of one or more respective communication links, followed by obtaining a wait time T that is the sum of the first time length and the second time length. The wait time T is an example of a third time length.

The communication unit 114 of the newly installed communication apparatus 100 transmits a beacon signal serving as a search signal to detect another communication apparatus 100 with which communication is possible. The beacon signal is a digital signal in a packet format.

The communication unit 114 transmits a response signal responding to the search signal upon the passage of the wait time T, calculated by the time calculation unit 113, starting from the moment at which the search signal is received from another communication apparatus 100. The communication unit 114 is an example of a transmission unit.

The memory 115 stores parameter data including both the number of relays in the communication route from the communication apparatus 100 having this memory 115 to a parent apparatus (relay count), and the RSSI value of each communication link included in such a communication route. The memory 115 further stores data indicative of a calculation formula for calculating the wait time T and the ID (identification) of the communication apparatus 100. The ID will be included in the search signal and the response signal.

Figure 4:
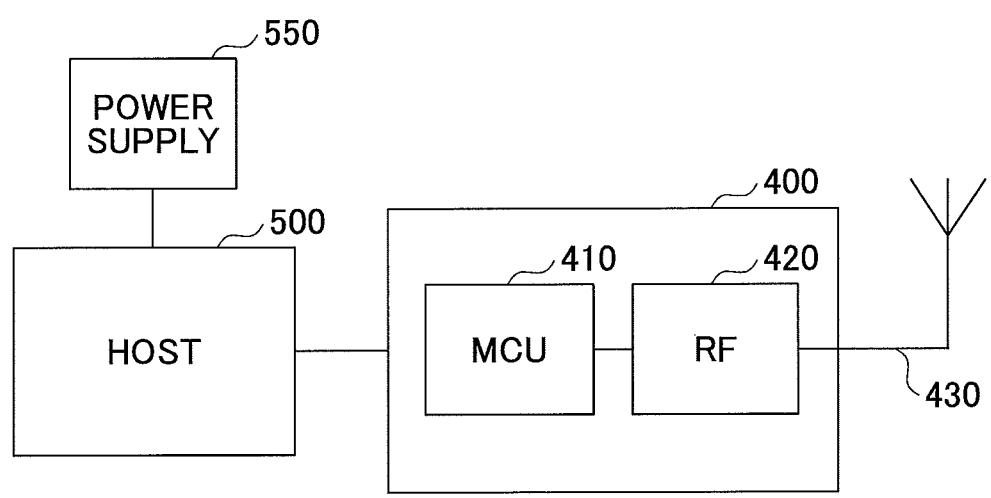
FIG. 4 is a drawing illustrating an example of the parent apparatus of the embodiment.

FIG. 4 is a drawing illustrating an example of the parent apparatus 400 of the present embodiment.

The parent apparatus 400 is a wireless apparatus, and includes an MCU (microcomputer unit) 410, an RF (radio frequency) circuit 420 and an antenna 430. The MCU 410 performs processes for communicating with the communication apparatus 100 serving as a child apparatus after a communication route is set as previously described. The RF circuit 420 serves to perform conversion between data signals and high frequency signals between the MCU 410 and the antenna 430. The antenna 430 is not limited to a particular type of antenna, and may be a monopole antenna or dipole antenna, for example.

The parent apparatus 400 is coupled to a host computer (HOST) 500, which is coupled to a power supply 550. The host computer 500 performs transmission of commands and the like in connection with processes performed by the MCU 410.

FIG. 5 is a drawing illustrating parameter data stored in the memory 115 of a communication apparatus. In FIG. 5, parameter data corresponds to the child apparatus D3 is not set, as FIG. 5 illustrates parameter data in a condition in which the child apparatus is newly introduced to the communication system as illustrated in FIG. 2, and a communication route between the child apparatus D3 and the parent apparatus C1 is not established yet.

The parameter data stored in the memory 115 is provided in a table format in which data indicative of a relay count, the RSSI value of a link 1 and the RSSI value of a link 2 are included.

"Link 1" is a communication link from the local communication apparatus 100 to an adjacent relaying communication apparatus 100 or to the parent apparatus 400. In the case of the communication route from the child apparatus D3 to the parent apparatus C1 through the child apparatus D1 illustrated in FIG. 2, the link 1 refers to the communication link between the child apparatus D1 and the child apparatus D3 that is the first communication link from the child apparatus D3. "RSSI value of the link 1" in the table refers to the RSSI value of the link 1. In the above-described communication route, this RSSI value is the RSSI value of the communication link between the child apparatus D1 and the child apparatus D3.

"Link 2" is a communication link following the link 1. In the communication route from the child apparatus D3 to the parent apparatus C1 through the child apparatus D1 illustrated in FIG. 2, the link 2 refers to the communication link between the child apparatus D1 and the parent apparatus C1. "RSSI value of the link 2" in the table refers to the RSSI value of the link 2, which is the RSSI value of the communication link between the child apparatus D1 and the parent apparatus C1 illustrated in the above-described communication route.

"Relay count" refers to the number of relays required for communication between the communication apparatus 100 that is next to the local communication apparatus 100 and the final destination, the parent apparatus C1. In the communication route from the child apparatus D3 to the parent apparatus C1 through the child apparatus D1, the child apparatus D1 can directly communicate with the parent apparatus C1, so that the number of relays of the child apparatus D1 is "0" in FIG. 5. In the case of the communication route from the child apparatus D3 to the parent apparatus C1 through the child apparatuses D2 and D1 illustrated in FIG. 2, the child apparatus D1 relays the communication between the child apparatus D2 and the parent apparatus C1, so that the number of relays of the child apparatus D2 is "1" in FIG. 5.

Parameter data stored in the memory 115 of any given child apparatus only include the relay count, the RSSI value of the link 1 and the RSSI value of the link 2 of the communication route set between itself and the parent apparatus C1. However, in FIG. 5, all the parameter data indicative of relay counts, the RSSI value of the link 1 and the RSSI value of the link 2 for each of the child apparatuses, including the child apparatuses D1, D2 and D4 through D9, are illustrated in an aggregated manner for the sake of explanation.

In the case of the direct communication route being set in the child apparatus D1 to communicate with the parent apparatus C1, the memory 115 of the child apparatus D1 stores data only with respect to this communication route between the child apparatus D1 and the parent apparatus C1, as illustrated in the column of the child apparatus D1 in FIG. 5. Namely, the stored data include "0" for the relay count, "−40" dBm for the RSSI value of the link 1 which is a communication link between the child apparatus D1 and the parent apparatus C1, and "NA" for the RSSI value of the link 2 because the link 2 is nonexistent.

In the case of the communication route to the parent apparatus C1 through the child apparatus D1 being set in the child apparatus D2, the memory 115 of the child apparatus D2 stores data only with respect to this communication route as illustrated in the column of the child apparatus D2 in FIG. 5. Namely, the stored data include "1" for the relay count, "−40" dBm for the RSSI value of the link 1 which is a communication link between the child apparatus D2 and the child apparatus D1, and "−40" dBm for the RSSI value of the link 2 which is a communication link between the child apparatus D1 and the parent apparatus C1.

In the following, a description will be given of a method of securing a communication route that ensures proper data communication even when there are child apparatuses unable to communicate with each other or when there is a child apparatus unable to transmit a response signal before the end of the response waiting period.

The premise is that the relay counts, the RSSI value of the link 1 and the RSSI value of the link 2 corresponds to each of the child apparatuses are already known as illustrated in FIG. 5 prior to the installment of the child apparatus D3. Further, the most preferable communication route for the child apparatus D3 is the communication route to the parent apparatus C1 through the child apparatus D1.

In the communication system of a first embodiment, the time calculation unit 113 of the communication apparatus 100 used as a child apparatus calculates, according to formula (1) shown below, the waiting time T during which to wait to transmit a response signal after receiving a search signal, and then transmits the response signal upon the passage of the waiting time T.

$$T = \text{Guard Band} + (\text{Relay Count}) \times \text{one [sec]} + (\text{RSSI Value of First Link}) \times \text{one [msec]} + (\text{RSSI Value of Second Link}) \times \text{one [msec]} \quad (1)$$

Here, "Guard Band" is a standby time that is flatly included in the waiting time T, and may be set to 10 milliseconds, for example.

"Relay Count" is the relay count specified in the parameter data. The time length obtained by multiplying the Relay Count by one second is added in the waiting time T. The time length obtained by multiplying the Relay Count by one second is an example of the first time length, and the one second that is multiplied by the Relay Count is an example of the first unit time length.

"RSSI Value of First Link" is the RSSI value of link 1 specified in the parameter data, and assumes an absolute value as expressed in dBm. For example, RSSI Value of First Link is "40" in the case of the value being −40 dBm. The time length obtained by multiplying the RSSI Value of First Link by one millisecond is an example of the second time length, and one millisecond that is multiplied by the RSSI Value of First Link is an example of the second unit time length.

"RSSI Value of Second Link" is the RSSI value of link 2 specified in the parameter data, and similar to the RSSI Value of First Link, assumes an absolute value as expressed in dBm. The time length obtained by multiplying the RSSI Value of Second Link by one millisecond is an example of the second time length, and one millisecond that is multiplied by the RSSI Value of Second Link is an example of the second unit time length.

The first unit time length is set to a value longer than the second unit time length in order to provide a larger weighting factor for the relay count than for the RSSI value of each communication link in the route toward the parent apparatus.

Such an arrangement is made in order to select child apparatuses such that a criteria for selecting a child apparatus having a fewer relay count is given the highest priority, and the next highest priority is given to the criteria that requires a satisfactory RSSI value of each communication link in the route toward the parent apparatus. Here, the fact that the RSSI value is satisfactory means the RSSI value has a small absolute value.

In the situation illustrated in FIG. 2, the child apparatus D6 does not send a response signal to the child apparatus D3, and is unable to have direct communication with the child apparatus D3. Therefore, the child apparatus D6 thus be excluded in the calculation of the waiting time T.

The child apparatus D7 has a larger relay count and the calculated waiting time T becomes the maximum among the child apparatuses. The child apparatus D7 can thus be excluded from the consideration.

It is further assumed that the child apparatuses D8 and D9 do not transmit a response signal within the response waiting period.

In the following, the order in which the child apparatuses D1, D2, D4 and D5 transmit a response signal to the child apparatus D3 will be considered.

The waiting times T1, T2, T4 and T5, corresponds to the child apparatuses D1, D2, D4, and D5, respectively, are calculated by formula (1) based on the stored parameter data as follows.

$T1=10 \text{ [msec]}+0\times\text{one [sec]}+40 \text{ [msec]}+0 \text{ [msec]}=50$ [msec]

$T2=10 \text{ [msec]}+1\times\text{one [sec]}+40 \text{ [msec]}+40 \text{ [msec]}=1090$ [msec]

$T4=10 \text{ [msec]}+0\times\text{one [sec]}+90 \text{ [msec]}+0 \text{ [msec]}=100$ [msec]

$T5=10 \text{ [msec]}+1\times\text{one [sec]}+70 \text{ [msec]}+70 \text{ [msec]}=1150 \text{ [msec]}$ In this manner, the waiting time increases in the following order: T1, T4, T2, and T5, so that the child apparatuses transmit a response signal in the following order: D1, D4, D2, and D5.

Figure 6:
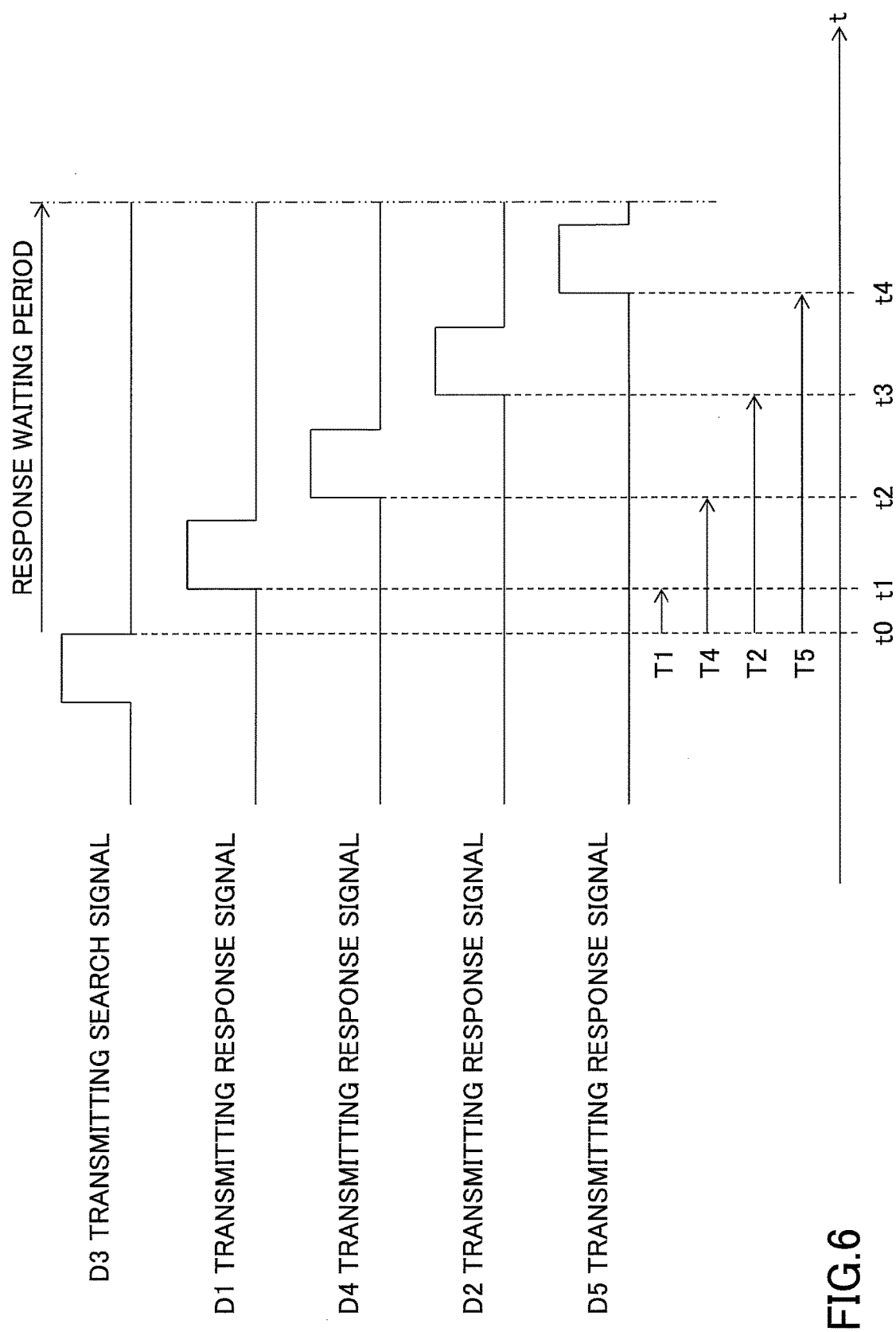
FIG. 6 is a timing chart illustrating the transmission of response signals by child apparatuses in response to a search signal from another child apparatus.

FIG. 6 is a timing chart illustrating the transmission of response signals by the child apparatuses D1, D4, D2, and D5 in response to a search signal from the child apparatus D3. FIG. 6 illustrates the timing of the search signal transmitted by the child apparatus D3 and the timing of the response signals transmitted by the child apparatuses D1, D3, D4, and D5. The horizontal axis represents time t.

As illustrated in FIG. 6, the child apparatus D3 completes the transmission of the search signal at time t0. The child apparatus D1 then starts transmitting its response signal at time t1 that corresponds to the end of the waiting time T1 starting from time t0. The child apparatus D4 starts transmitting its response signal at time t2 that corresponds to the end of the waiting time T4 starting from time t0. The child apparatus D2 starts transmitting its response signal at time t3 that corresponds to the end of the waiting time T2 starting from time t0. The child apparatus D5 starts transmitting its response signal at time t4 that corresponds to the end of the waiting time T5 starting from time t0.

As is seen in the above description, the waiting time T1 of the child apparatus D1 is the shortest. The response signal of the child apparatus D1 is thus first transmitted in response to the search signal from the child apparatus D3.

As was previously described, the child apparatus D1 is the relaying child apparatus in the most preferable communication route to the parent apparatus C1 for the child apparatus D3.

Formula (1) has weighting factors for a relay count and RSSI values such that the calculated waiting time T is the shortest for the child apparatus that is a relay point in the most preferable communication route.

From the viewpoint of the child apparatus D3, the child apparatus D1 is regarded as having the shortest waiting time T1 and thus as being the child apparatus that has a small relay count and a satisfactory RSSI value in each communication link, as the child apparatus D3 receives the response signal from the child apparatus D1 first. In the communication system of the present embodiment, the child apparatus having the shortest waiting time T is selected as a relay point for the child apparatus that is newly added to the communication system.

It may be noted that while any one of the child apparatuses is transmitting a response signal, a remaining child apparatus refrains from transmitting a response signal similarly to the carrier-sense method.

Figure 7A:
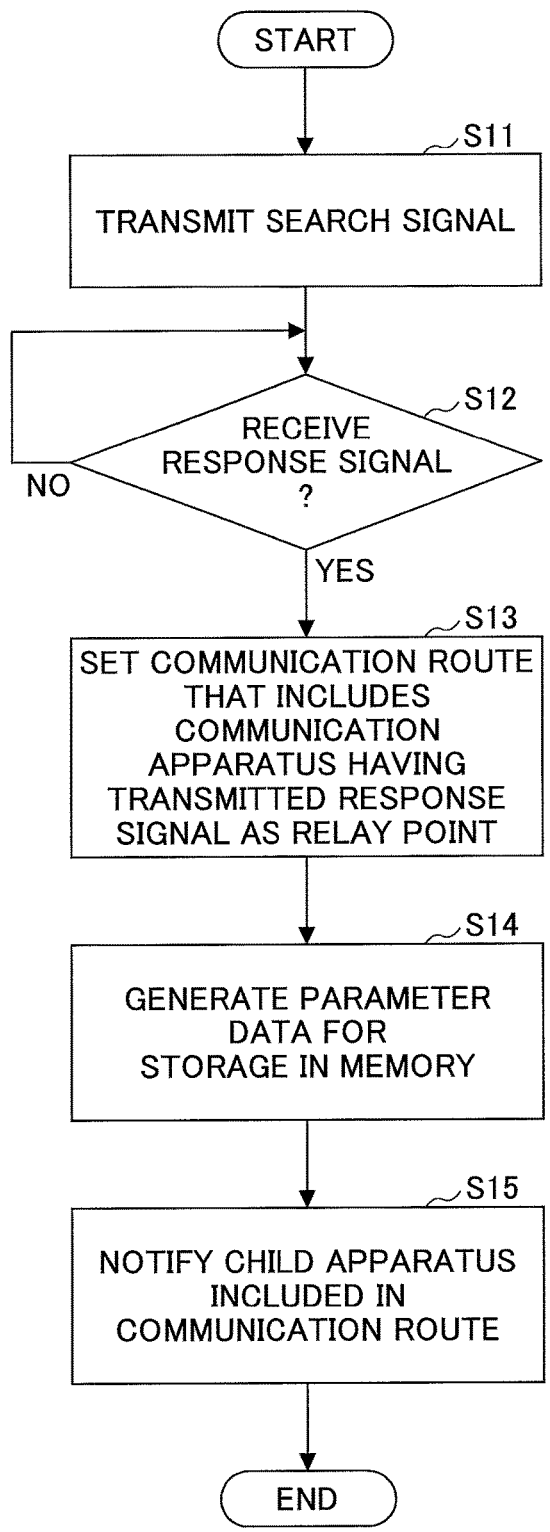
FIGS. 7A and 7B are flowcharts illustrating procedures performed by the communication apparatus when a child apparatus is unable to have a direct connection with the parent apparatus.
Figure 7B:
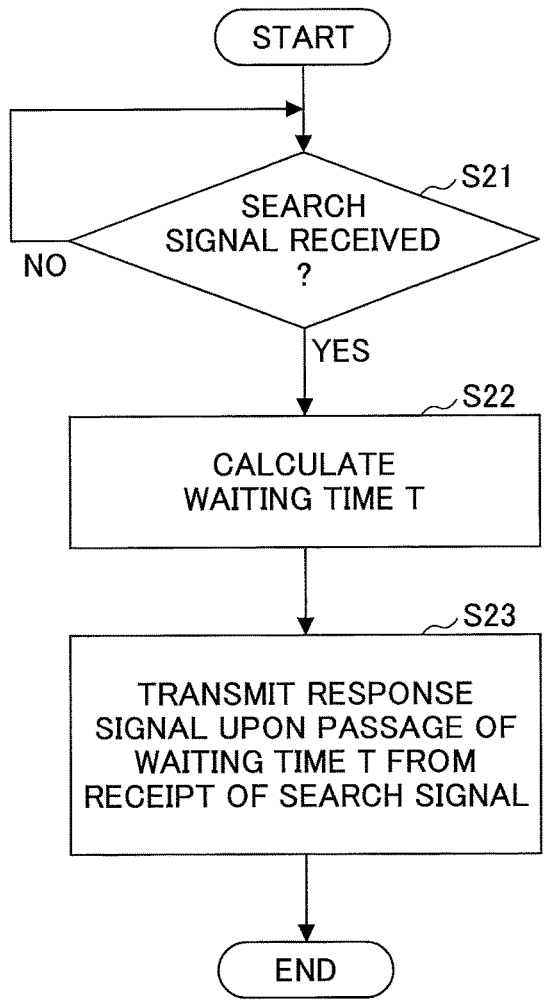

FIGS. 7A and 7B are flowcharts illustrating procedures performed by communication apparatuses 100. The flowchart of FIG. 7A illustrates a procedure performed by the newly installed communication apparatus 100 (referred to as "communication apparatus 100a"). It is assumed that the communication apparatus 100a is unable to have a direct connection with the parent apparatus. The flowchart of FIG. 7B illustrates a procedure performed by the communication apparatus 100 existing in the communication system (referred to as "communication apparatus 100b").

As illustrated in FIG. 7A, the MCU 110 of the communication apparatus 100a transmits a search signal (step S11). The process of step S11 is performed by the communication unit 114 and the search signal is wirelessly transmitted through the RF circuit 120. The ID of the communication apparatus 100a is stored in the memory 115.

The MCU 110 checks whether a response signal is received from another communication apparatus (step S12). The process of step S12 is performed by the detection unit 111. The response signal includes the ID of the communication apparatus 100b that has transmitted this response signal, and the parameter data stored in the memory 115 of such the communication apparatus 100b. The process of step S12 is repeatedly performed until the receipt of a response signal.

Upon detecting the receipt of a response signal (YES in S12), the MCU 110 selects and sets the communication route to the parent apparatus that the communication apparatus 100b having transmitted the response signal is set as a relay point (step S13). The communication apparatus 100b having transmitted the response signal is identified based on the ID included in the response signal. As was previously described, the communication apparatus that transmits a response signal ahead of all the other communication apparatuses has the shortest waiting time, which may be an indication of a fewer relay count and more satisfactory RSSI values. In step S13, thus, the communication apparatus that has first transmitted a response signal is selected as a relay point.

The MCU 110 generates own parameter data by adding "one" to the relay count specified in the parameter data that is included in the response signal received in step S12, and the RSSI value of the received response signal as the RSSI value of the link land stores in the memory 115 (step S14). The RSSI value of the link 1 that is included in the received response signal is set to the RSSI value of the link 2 in the newly generated parameter data.

The processes of steps S13 and S14 are performed by the setting unit 112.

The MCU 110 notifies the communication apparatus 100b from which the response signal has been received in step S12 that this communication apparatus 100b has been included in the communication route set in the local communication apparatus 100 (step S15). In the case where the child apparatus D3 is newly introduced and detects the receipt of a response signal from the child apparatus D1 is step S12, the child apparatus D3 reports to the child apparatus D1 that the communication route to the parent apparatus C1 set in the child apparatus D3 in step S15.

The notification to the child apparatus D1 may be performed by transmitting packet data including the ID of the child apparatus D1 and an information bit indicative of the inclusion into a communication route.

In this manner, a communication route is set and parameter data is generated.

The parent apparatus may transmit a response signal in response to a search signal similarly to child apparatuses. In such a case, the newly added communication apparatus may have a direct connection with the parent apparatus, and may receive a response signal from the parent apparatus in step S12. The communication apparatus learns based on the ID included in the received response signal that direct communication with the parent apparatus is possible. In this case, the communication apparatus sets a direct communication route to the parent apparatus without using another communication apparatus serving as a relay point.

The procedure illustrated in FIG. 7B is performed by the MCU 110 of the communication apparatus 100b when a communication apparatus 100a is newly installed in the communication system.

The MCU 110 checks whether a search signal is received from a new communication apparatus (step S21). A response signal has a flag that is set to "1" in the bit indicative of a search signal in packet data. The MCU 110 reads the flag in the received packet data to determine whether to have received a search signal. The process of step S21 is performed by the detection unit 111. The process of step S21 is repeatedly performed until the receipt of a response signal at constant intervals, for example.

Upon detecting that a search signal is received (YES in S21), the MCU 110 calculates its waiting time T by use of formula (1) (step S22). The waiting time T is calculated based on the stored parameter data.

The MCU 110 transmits a response signal at the end of the calculated waiting time T starting at the receipt of the search signal (step S23).

The procedure by the MCU 110 comes to an end.

After transmitting a response signal, a notice of step S15 indicating the inclusion of the local communication apparatus 100b into the communication route may be received from the newly added communication apparatus 100a. The local communication apparatus may then perform processes such as making a setting that indicates participation in the communication route between the new communication apparatus and the parent apparatus.

According to the communication system of the embodiment, the waiting time T is obtained by giving a greater weighting factor to a relay count than to an RSSI value of each communication link in the route to the parent apparatus. Such a waiting time T is then used to select a child apparatus as a relay point for another child apparatus that is newly incorporated in the communication system. This arrangement serves to set the most preferable communication route to the parent apparatus with respect to the newly incorporated child apparatus.

According to the embodiment, the communication system is provided that ensures a stable communication route.

In the description provided heretofore, the first unit time length is set to one second, and the second unit time length is set to one millisecond in order to give a greater waiting factor to a relay count than to an RSSI value of each communication link in the route to the parent apparatus.

The first unit time length and the second unit time length are not limited to these examples. As long as the waiting times T1, T2, T4, and T5 having the lengths thereof in the same order as the order obtained by use of formula (1) are obtained, any time lengths may be set to the first unit time length and the second unit time length. Further, the description has been given with respect to the example in which the waiting time T obtained by use of formula (1) is used to set the time length that passes before the child apparatus transmits a response signal. Instead of formula (1), formula (2) shown in the following may be used to obtain a waiting time T10.

$$T10 = \text{Guard Band} + (\text{Relay Count}) \times \text{one [sec]} \times \text{Weight} + \{(\text{RSSI Value of First Link} \times \text{one [msec]})^2 + (\text{RSSI Value of Second Link} \times \text{one [msec]})^2\}^{1/2} \quad (2)$$

"Weight" is a weighting factor that is given to the first time length obtained by multiplying the relay count by one second.

$\{(\text{RSSI Value of First Link} \times \text{one [msec]})^2 + (\text{RSSI Value of Second Link} \times \text{one [msec]})^2\}^{1/2}$ is the root sum square of the RSSI value of the first link and the RSSI value of the second link each multiplied by one millisecond.

The child apparatuses D1, D2, D4 and D5 calculate the waiting times T11, T12, T14 and T15, respectively, based on the stored parameter data as follows. The waiting times T11, T12, T14 and T15 are the waiting times obtained by formula (2) based on the parameter data of the child apparatuses D1, D2, D4 and D5, respectively.

$T11 = 10 \text{ [msec]} + 0 \times \text{one [sec]} \times 2 + 40 \text{ [msec]} = 50 \text{ [msec]}$ $T12 = 10 \text{ [msec]} + 1 \times \text{one [sec]} \times 2 + 56 \text{ [msec]} = 2066 \text{ [msec]}$ $T14 = 10 \text{ [msec]} + 0 \times \text{one [sec]} \times 2 + 90 \text{ [msec]} = 100 \text{ [msec]}$ $T15 = 10 \text{ [msec]} + 1 \times \text{one [sec]} \times 2 + 99 \text{ [msec]} = 2109 \text{ [msec]}$ In this manner, the waiting times are calculated such as to increase in the following order: T11, T14, T12, and T15, so that the child apparatuses transmit a response signal in the following order: D1, D4, D2, and D5. This arrangement gives the same result as in the case in which formula (1) is used to calculate the waiting times T1, T4, T2, and T5.

The use of the waiting time T10 calculated by use of formula (2) thus enables the selection of the most preferable communication route to the parent apparatus with respect to the child apparatus that is newly incorporated in the communication system. This enables the provision of a communication system that ensures a stable communication route.

The descriptions of the heat sink and semiconductor device of exemplary embodiments have been provided heretofore. The present invention is not limited to these embodiments, but various variations and modifications may be made without departing from the scope of the present invention.

Further, the present invention is not limited to these embodiments, but various variations and modifications may be made without departing from the scope of the present invention.

The present application is based on Japanese priority application No. 2015-008116 filed on Jan. 19, 2015, with the Japanese Patent Office, the entire contents of which are hereby incorporated by reference.

What is claimed is:

1. A communication apparatus for communicating with another communication apparatus at a destination directly or indirectly via one or more other communication apparatuses through a communication route, comprising:

a storage unit configured to store a relay count indicative of a number of other communication apparatus serving as a relay point in the communication route between the communication apparatus and the destination, and data indicative of a signal strength in each communication link existing in the communication route, the communication link being defined between two communication apparatuses;

a calculation unit configured to calculate a first time length by multiplying a first weighting time length by the relay count stored in the storage unit, a second time length by multiplying a second weighting time length by a numerical value indicative of the signal strength of each communication link, and a third time length by adding the first time length and the second time length, the first weighting time length being longer than the second weighting time length; and a transmission unit configured to transmit, upon passage of the third time length starting from a time of receipt of a search signal from another communication apparatus, a response signal responding to the search signal.

2. The communication apparatus as claimed in claim 1, wherein a communication apparatus having transmitted the response signal ahead of any other communication apparatuses is selected and set as a most adjacent relay point for communicating with the communication apparatus at the destination.

3. A communication apparatus for communicating with a communication apparatus at a destination directly or indirectly via one or more communication apparatuses through a communication route, comprising:

a transmission unit configured to transmit a search signal to other communication apparatus;

a receiving unit configured to receive a response signal transmitted by any communication apparatus responding to the search signal;

a control unit configured to generate, in response to the response signal, data indicative of a number of communication apparatus serving as a relay point in the communication route to the destination and a signal strength in a communication link existing in the communication route, the communication link being defined between two communication apparatuses; and a storage unit configured to store the generated data, wherein the control unit is configured to select and set another communication apparatus as a most adjacent relay point for communicating with the communication apparatus at the destination, such another communication apparatus having transmitted the response signal ahead of any other communication apparatuses.

4. A communication system comprising:

communication apparatuses that form a communication network from each other, any of the communication apparatuses is configured to communicate with a destination communication apparatus through a communication route directly or indirectly via other communication apparatus serving as a relay point for relaying communication through the communication route;

wherein at least one of the communication apparatuses includes:

a storage configured to store a relay count indicative of a number of the relay point in the communication route between the communication apparatus and the destination communication apparatus, and data indicative of a signal strength in a communication link existing in the communication route, the communication link being a link between two communication apparatuses;

a calculator configured to calculate, upon receiving a signal from the other communication apparatus, a time length by adding a first time length and a second time length, the first time length being obtained by multiplying the relay count stored in the storage by a first weighting factor, and a second time length being obtained by multiplying the signal strength stored in the storage by a second weighting factor, the first weighting factor being lager than the second weighting factor;

a transmitter configured to transmit a response signal in response to the received signal upon passage of the calculated time length; and a setting unit configured to select the other communication apparatus that has transmitted the response signal ahead of the remaining communication apparatus as the relay point when no direct communication with the destination communication apparatus is enabled and set the communication route that includes the selected relay point.

5. The communication system as claimed in claim 4, wherein the storage is configured to store data indicative of the signal strength between the communication apparatus and either of the destination communication apparatus or the relay point, and data indicative of the signal strength between two other communication apparatuses within the communication route if at least one relay point exists in the communication route, and the calculator obtains the second time length by using the plural data indicative of the signal strength.

6. The communication system as claimed in claim 5, wherein the calculator calculates the second time length by calculating square root of sum of squares of each signal strength multiplied by the second weighing factor.

7. The communication system as claimed in claim 4, wherein when the communication apparatus is added into the communication system, the communication apparatus transmits, to the other communication apparatus selected as the relay point, data indicative of an inclusion of the other communication apparatus in the communication route upon setting the communication route.

* * * * *